(12) United States Patent
Barton et al.

(10) Patent No.: US 10,114,945 B2
(45) Date of Patent: Oct. 30, 2018

(54) CLOCK ROLLBACK SECURITY

(71) Applicant: Citrix Systems, Inc., Fort Lauderdale, FL (US)

(72) Inventors: Gary Barton, Boca Raton, FL (US); Brandon Olekas, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 40 days.

(21) Appl. No.: 14/701,561

(22) Filed: May 1, 2015

(65) Prior Publication Data

US 2015/0317478 A1 Nov. 5, 2015

Related U.S. Application Data

(60) Provisional application No. 61/988,595, filed on May 5, 2014.

(51) Int. Cl.
| | |
|---|---|
| *G06F 21/55* | (2013.01) |
| *G06F 21/62* | (2013.01) |
| *G06F 21/72* | (2013.01) |
| *H04L 29/08* | (2006.01) |

(52) U.S. Cl.
CPC ............ *G06F 21/55* (2013.01); *G06F 21/554* (2013.01); *G06F 21/629* (2013.01); *G06F 21/725* (2013.01); *G06F 2221/034* (2013.01); *G06F 2221/2135* (2013.01); *G06F 2221/2137* (2013.01); *G06F 2221/2139* (2013.01); *H04L 67/125* (2013.01)

(58) Field of Classification Search
CPC ............................... G06F 21/55; H04L 67/125
USPC .......................................................... 726/27
See application file for complete search history.

(56) References Cited

U.S. PATENT DOCUMENTS

| | | | | |
|---|---|---|---|---|
| 8,141,089 B2* | 3/2012 | Corrigan | ................. | G06F 9/526 718/100 |
| 8,176,176 B1* | 5/2012 | Chan | ...................... | H04L 67/22 455/405 |
| 8,688,924 B2* | 4/2014 | Holtzman | ............... | G06F 21/10 700/306 |
| 9,070,119 B2* | 6/2015 | Catipon, Jr. | ......... | G06Q 10/109 |

(Continued)

FOREIGN PATENT DOCUMENTS

| | | |
|---|---|---|
| EP | 1821234 A2 | 8/2007 |
| WO | 2014/018895 A1 | 1/2014 |
| WO | 2014/062420 A1 | 4/2014 |

*Primary Examiner* — Lynn D Feild
*Assistant Examiner* — Dereena T Cattungal
(74) *Attorney, Agent, or Firm* — Banner & Witcoff, Ltd.

(57) ABSTRACT

Methods and systems for preventing clock rollback attacks are described herein. A rollback attack may occur when a user manually sets a system clock to a date/time earlier than the actual present day date and time, thereby tricking any software relying on the system clock to believe it is in fact the earlier date and time rather than the current date and time. According to aspects described herein, a particular application may check and store a record of the system time when an application goes inactive (or at intervals) and again when the application subsequently is activated again. When the application determines that the time has gone backward, the application (or system) may take some remedial measure(s) to prevent further use of the application (or system) until the user reestablishes trust (e.g., by reauthenticating or reestablishing a connection with a trusted time server).

21 Claims, 4 Drawing Sheets

(56) References Cited

U.S. PATENT DOCUMENTS

| | | | |
|---|---|---|---|
| 2003/0004875 A1 | 1/2003 | Kramer et al. | |
| 2004/0019687 A1* | 1/2004 | Ozawa | G06F 21/41 709/229 |
| 2004/0073660 A1* | 4/2004 | Toomey | H04L 63/08 709/224 |
| 2006/0095553 A1* | 5/2006 | Ogawa | G06F 21/725 709/223 |
| 2006/0294593 A1* | 12/2006 | Eldar | G06F 21/725 726/26 |
| 2007/0110109 A1* | 5/2007 | Jennings | G06F 21/10 370/516 |
| 2007/0150842 A1* | 6/2007 | Chaudhri | G06F 3/04883 715/863 |
| 2008/0304364 A1* | 12/2008 | Holtzman | G06F 21/10 368/10 |
| 2009/0287942 A1* | 11/2009 | Betouin | G06F 1/14 713/194 |
| 2009/0288012 A1* | 11/2009 | Hertel | G06Q 20/02 715/738 |
| 2012/0036220 A1* | 2/2012 | Dare | G06F 8/61 709/217 |
| 2013/0007471 A1* | 1/2013 | Grab | G06F 21/10 713/193 |
| 2014/0033323 A1* | 1/2014 | Moroney | G06F 21/60 726/27 |
| 2014/0058801 A1* | 2/2014 | Deodhar | G06Q 10/0639 705/7.38 |
| 2014/0095887 A1* | 4/2014 | Nayshtut | G06F 21/57 713/189 |
| 2014/0359111 A1* | 12/2014 | Hilmo | H04L 47/762 709/224 |

\* cited by examiner

CLOCK ROLLBACK SECURITY

CROSS-REFERENCE TO RELATED CASES

This application claims priority to provisional U.S. application Ser. No. 61/988,595, filed May 5, 2014, and entitled "Clock Rollback Security," herein incorporated by reference in its entirety.

FIELD

Aspects described herein generally relate to computer security. More specifically, aspects described herein relate to preventing a user from gaining unauthorized access to a restricted resource by changing the time associated with a system clock.

BACKGROUND

Mobile devices, such as smart phones, personal digital assistants, tablet computers, other types of mobile and non-mobile computing devices, are becoming increasingly popular. More and more people are using mobile devices in personal and business settings for a variety of purposes. These devices are often used by employees to access company resources, sometimes from remote or unusual locations. At times, an employee may be working in an offline mode, e.g., while on an airplane without an Internet connection. When in such an offline mode, an enterprise application may rely on a local system clock on the device to determine a current date/time. However, users are provided the ability to manually change the local system clock to anything he or she wants, which can cause problems when relied on by a software application.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards preventing clock rollback attacks. A rollback attack may occur when a user manually sets a system clock to a date/time earlier than the actual present day date and time, thereby tricking any software relying on the system clock to believe it is in fact the earlier date and time rather than the current date and time. According to aspects described herein, a particular application may check and store a record of the system time when an application goes inactive (or at intervals) and again when the application subsequently is activated again. When the application determines that the time has gone backward, the application (or system) may take some remedial measure(s) to prevent further use of the application (or system) until the user reestablishes trust (e.g., by reauthenticating or reestablishing a connection with a trusted time server).

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards techniques for preventing rollback attacks. A rollback attack occurs when a malicious user changes (or "rolls back") the local system clock on a computing device to a date and time such that an action is permitted on the computing device, when the action would otherwise be denied if the date and time were accurate.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
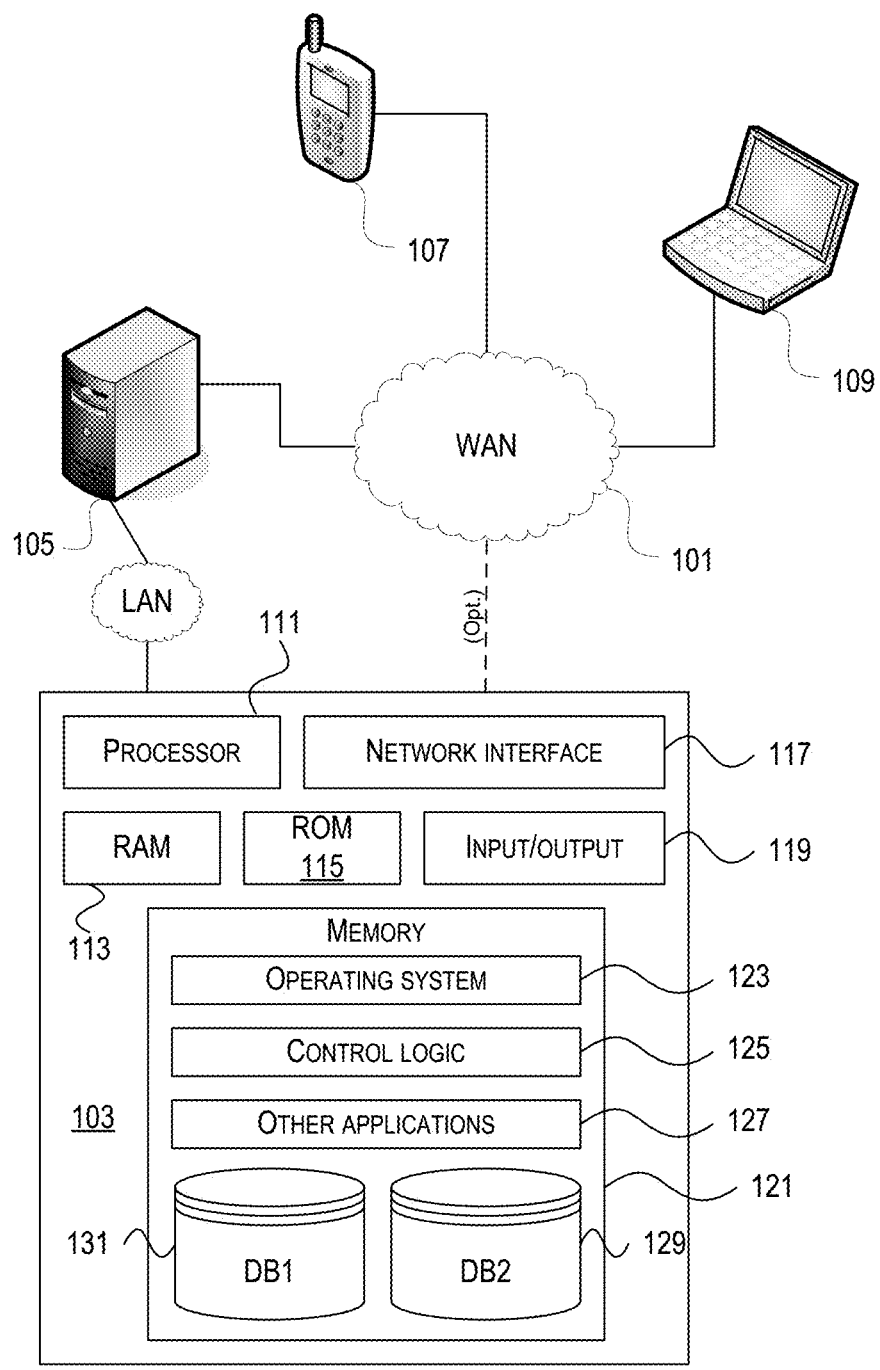
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown)

may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Enterprise Mobility Management Architecture

Figure 2:
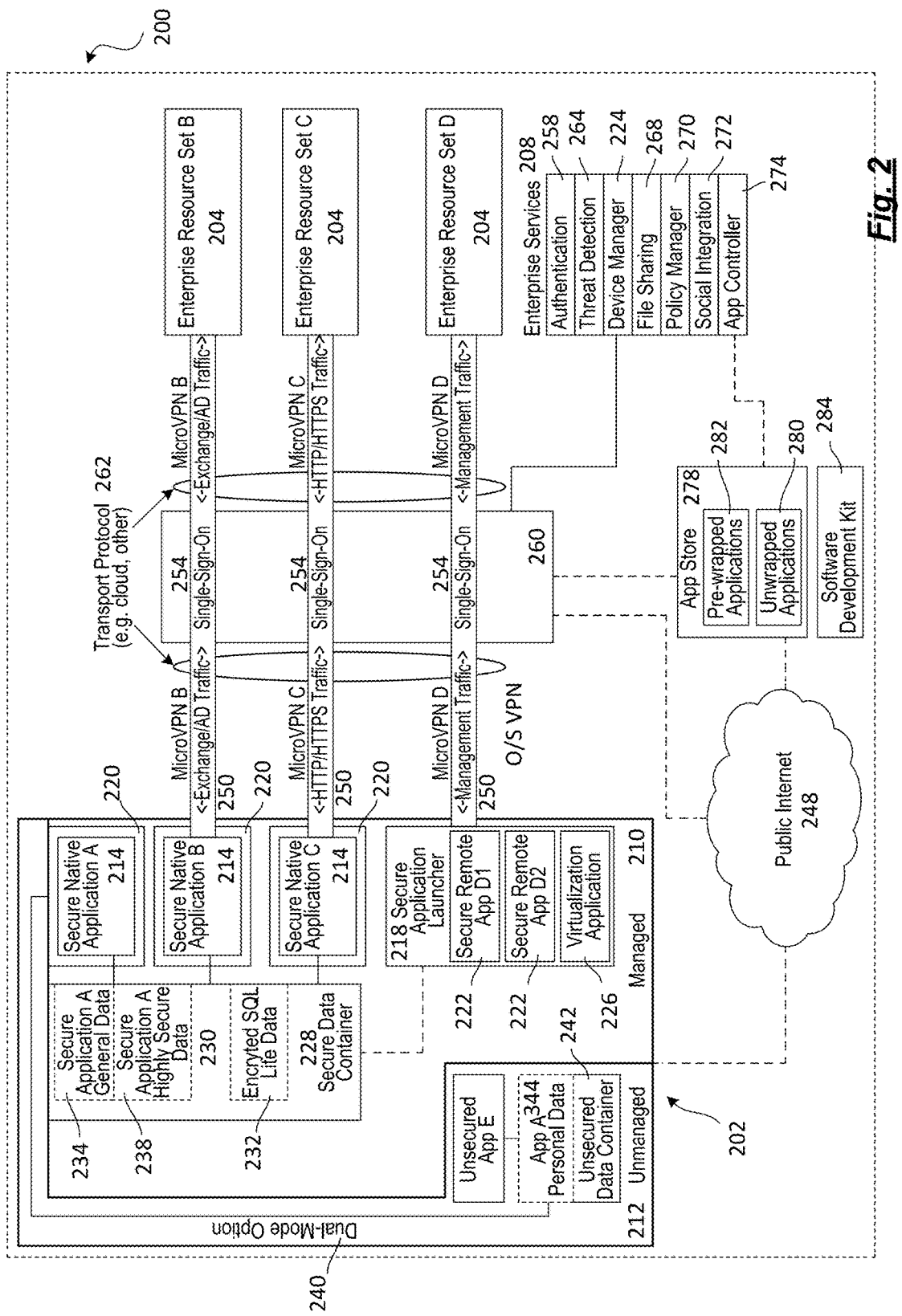
FIG. 2 depicts an illustrative enterprise mobility management system.

FIG. 2 represents an enterprise mobility technical architecture 200 for use in a BYOD environment. The architecture enables a user of a mobile device 202 to both access enterprise or personal resources from a mobile device 202 and use the mobile device 202 for personal use. The user may access such enterprise resources 204 or enterprise services 208 using a mobile device 202 that is purchased by the user or a mobile device 202 that is provided by the enterprise to user. The user may utilize the mobile device 202 for business use only or for business and personal use. The mobile device may run an iOS operating system, and Android operating system, or the like. The enterprise may choose to implement policies to manage the mobile device 204. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 204 that is managed through the application of mobile device management policies may be referred to as an enrolled device.

In some embodiments, the operating system of the mobile device may be separated into a managed partition 210 and an unmanaged partition 212. The managed partition 210 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 214, secure remote applications 222 executed by a secure application launcher 218, virtualization applications 226 executed by a secure application launcher 218, and the like. The secure native applications 214 may be wrapped by a secure application wrapper 220. The secure application wrapper 220 may include integrated policies that are executed on the mobile device 202 when the secure native application is executed on the device. The secure application wrapper 220 may include meta-data that points the secure native application 214 running on the mobile device 202 to the resources hosted at the enterprise that the secure native application 214 may require to complete the task requested upon execution of the secure native application 214. The secure remote applications 222 executed by a secure application launcher 218 may be executed within the secure application launcher application 218. The virtualization applications 226 executed by a secure application launcher 218 may utilize resources on the mobile device 202, at the enterprise resources 204, and the like. The resources used on the mobile device 202 by the virtualization applications 226 executed by a secure application launcher 218 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 204, and the like. The resources used at the enterprise resources 204 by the virtualization applications 226 executed by a secure application launcher 218 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 228 in the managed partition 210 of the mobile device. The data secured in the secure data container may be accessed by the secure wrapped applications 214, applications executed by a secure application launcher 222, virtualization applications 226 executed by a secure application launcher 222, and the like. The data stored in the secure data container 228 may include files, databases, and the like. The data stored in the secure data container 228 may include data restricted to a specific secure application 230, shared among secure applications 232, and the like. Data restricted to a secure application may include secure general data 234 and highly secure data 238. Secure general data may use a strong form of encryption such as Advanced Encryption Standard (AES) 128-bit encryption or the like, while highly secure data 238 may use a very strong form of encryption such as AES 256-bit encryption. Data stored in the secure data container 228 may be deleted from the device upon receipt of a command from the device manager 224. The secure applications may have a dual-mode option 240. The dual mode option 240 may present the user with an option to operate the secured application in an unsecured or unmanaged mode. In an unsecured or unmanaged mode, the secure applications may access data stored in an unsecured data container 242 on the unmanaged partition 212 of the mobile device 202. The data stored in an unsecured data container may be personal data 244. The data stored in an unsecured data container 242 may also be accessed by unsecured applications 248 that are running on the unmanaged partition 212 of the mobile device 202. The data stored in an unsecured data container 242 may remain on the mobile device 202 when the data stored in the secure data container 228 is deleted from the mobile device 202. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 204 and enterprise services 208 at an enterprise, to the public Internet 248, and the like. The mobile device may connect to enterprise resources 204 and enterprise services 208 through virtual private network connections. The virtual private network connections, also referred to as microVPN or application-specific VPN, may be specific to particular applications 250, particular devices, particular secured areas on the mobile device, and the like 252. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 254. The single-sign-on processes may allow a user to provide a single set of authentication credentials, which are then verified by an authentication service 258. The authentication service 258 may then grant to the user access to multiple enterprise resources 204, without requiring the user to provide authentication credentials to each individual enterprise resource 204.

The virtual private network connections may be established and managed by an access gateway 260. The access gateway 260 may include performance enhancement features that manage, accelerate, and improve the delivery of enterprise resources 204 to the mobile device 202. The access gateway may also re-route traffic from the mobile device 202 to the public Internet 248, enabling the mobile device 202 to access publicly available and unsecured applications that run on the public Internet 248. The mobile device may connect to the access gateway via a transport network 262. The transport network 262 may be a wired network, wireless network, cloud network, local area network, metropolitan area network, wide area network, public network, private network, and the like.

The enterprise resources 204 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 204 may be premise-based resources, cloud based resources, and the like. The enterprise resources 204 may be accessed by the mobile device 202 directly or through the access gateway 260. The enterprise resources 204 may be accessed by the mobile device 202 via a transport network 262. The transport network 262 may be a wired network, wireless network, cloud network, local area network, metropolitan area network, wide area network, public network, private network, and the like.

The enterprise services 208 may include authentication services 258, threat detection services 264, device manager services 224, file sharing services 268, policy manager services 270, social integration services 272, application controller services 274, and the like. Authentication services 258 may include user authentication services, device authentication services, application authentication services, data authentication services and the like. Authentication services 258 may use certificates. The certificates may be stored on the mobile device 202, by the enterprise resources 204, and the like. The certificates stored on the mobile device 202 may be stored in an encrypted location on the mobile device, the certificate may be temporarily stored on the mobile device 202 for use at the time of authentication, and the like. Threat detection services 264 may include intrusion detection services, unauthorized access attempt detection services, and the like. Unauthorized access attempt detection services may include unauthorized attempts to access devices, applications, data, and the like. Device management services 224 may include configuration, provisioning, security, support, monitoring, reporting, and decommissioning services. File sharing services 268 may include file management services, file storage services, file collaboration services, and the like. Policy manager services 270 may include device policy manager services, application policy manager services, data policy manager services, and the like. Social integration services 272 may include contact integration services, collaboration services, integration with social networks such as Facebook, Twitter, and LinkedIn, and the like. Application controller services 274 may include management services, provisioning services, deployment services, assignment services, revocation services, wrapping services, and the like.

The enterprise mobility technical architecture 200 may include an application store 278. The application store 278 may include unwrapped applications 280, pre-wrapped applications 282, and the like. Applications may be populated in the application store 278 from the application controller 274. The application store 278 may be accessed by the mobile device 202 through the access gateway 260, through the public Internet 248, or the like. The application store may be provided with an intuitive and easy to use User Interface.

A software development kit 284 may provide a user the capability to secure applications selected by the user by wrapping the application as described previously in this description. An application that has been wrapped using the software development kit 284 may then be made available to the mobile device 202 by populating it in the application store 278 using the application controller 274.

The enterprise mobility technical architecture 200 may include a management and analytics capability 288. The management and analytics capability 288 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 3:
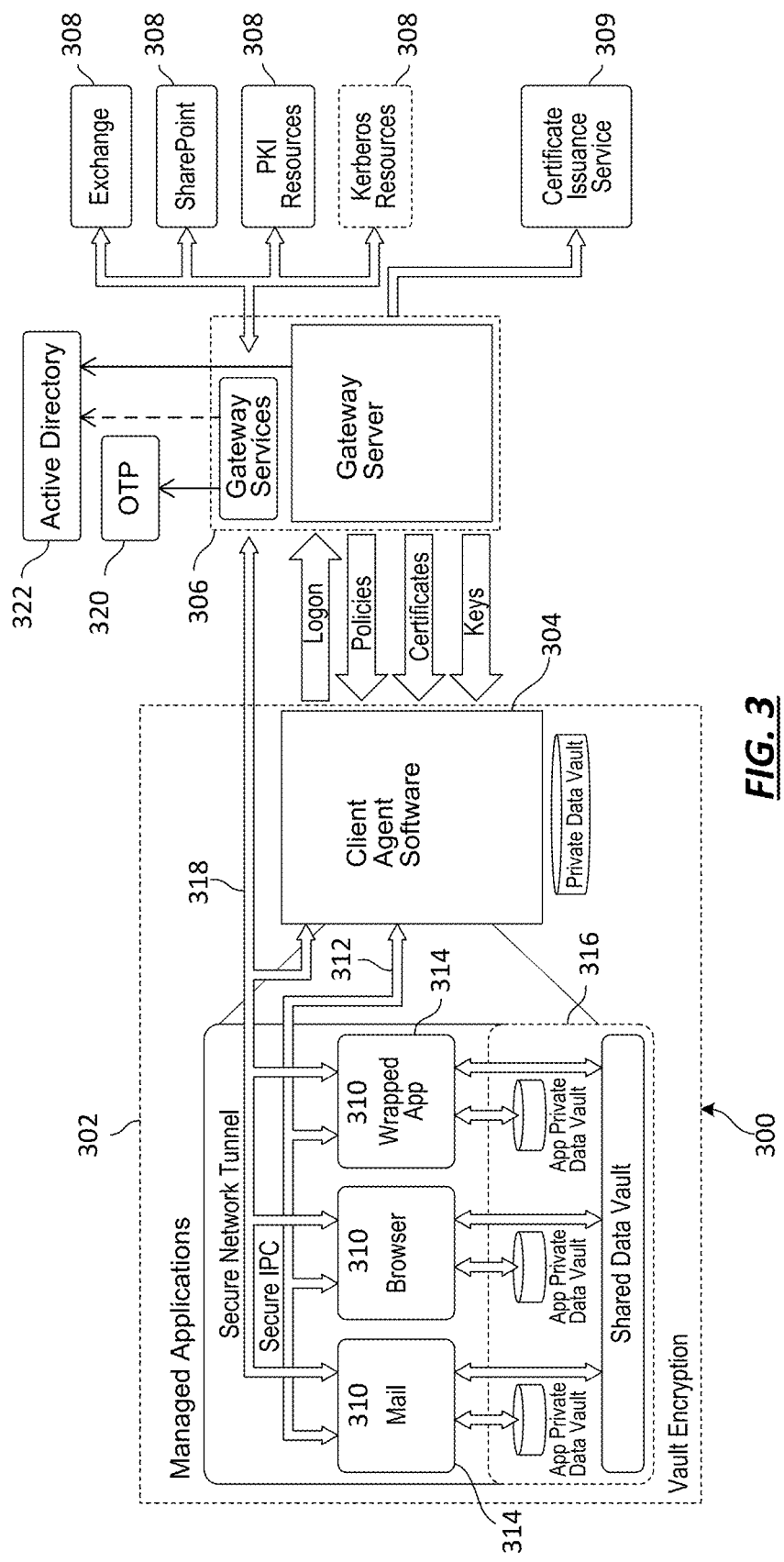
FIG. 3 depicts another illustrative enterprise mobility management system.

FIG. 3 is another illustrative enterprise mobility management system 300. Some of the components of the mobility management system 200 described above with reference to FIG. 2 have been omitted for the sake of simplicity. The architecture of the system 300 depicted in FIG. 3 is similar in many respects to the architecture of the system 200 described above with reference to FIG. 2 and may include additional features not mentioned above.

In this case, the left hand side represents an enrolled mobile device 302 with a client agent 304, which interacts with gateway server 306 (which includes Access Gateway and application controller functionality) to access various enterprise resources 308 and services 309 such as Exchange, Sharepoint, public-key infrastructure (PKI) Resources, Kerberos Resources, Certificate Issuance service, as shown on the right hand side above. Although not specifically shown, the mobile device 302 may also interact with an enterprise application store (StoreFront) for the selection and downloading of applications.

The client agent 304 acts as the UI (user interface) intermediary for Windows apps/desktops hosted in an Enterprise data center, which are accessed using the High-Definition User Experience (HDX)/ICA display remoting protocol. The client agent 304 also supports the installation and management of native applications on the mobile device 302, such as native iOS or Android applications. For example, the managed applications 310 (mail, browser, wrapped application) shown in the figure above are all native applications that execute locally on the device. Client agent 304 and application management framework of this architecture act to provide policy driven management capabilities and features such as connectivity and SSO (single sign on) to enterprise resources/services 308. The client agent 304 handles primary user authentication to the enterprise, normally to Access Gateway (AG) with SSO to other gateway server components. The client agent 304 obtains policies from gateway server 306 to control the behavior of the managed applications 310 on the mobile device 302.

The Secure interprocess communication (IPC) links 312 between the native applications 310 and client agent 304 represent a management channel, which allows client agent to supply policies to be enforced by the application management framework 314 "wrapping" each application. The IPC channel 312 also allows client agent 304 to supply credential and authentication information that enables connectivity and SSO to enterprise resources 308. Finally the IPC channel 312 allows the application management framework 314 to invoke user interface functions implemented by client agent 304, such as online and offline authentication.

Communications between the client agent 304 and gateway server 306 are essentially an extension of the management channel from the application management framework 314 wrapping each native managed application 310. The application management framework 314 requests policy information from client agent 304, which in turn requests it from gateway server 306. The application management framework 314 requests authentication, and client agent 304 logs into the gateway services part of gateway server 306 (also known as NetScaler Access Gateway). Client agent 304 may also call supporting services on gateway server 306, which may produce input material to derive encryption keys for the local data vaults 316, or provide client certificates which may enable direct authentication to PKI protected resources, as more fully explained below.

In more detail, the application management framework 314 "wraps" each managed application 310. This may be incorporated via an explicit build step, or via a post-build processing step. The application management framework 314 may "pair" with client agent 304 on first launch of an application 310 to initialize the Secure IPC channel and obtain the policy for that application. The application management framework 314 may enforce relevant portions of the policy that apply locally, such as the client agent login dependencies and some of the containment policies that restrict how local OS services may be used, or how they may interact with the application 310.

The application management framework 314 may use services provided by client agent 304 over the Secure IPC channel 312 to facilitate authentication and internal network access. Key management for the private and shared data vaults 316 (containers) may be also managed by appropriate interactions between the managed applications 310 and client agent 304. Vaults 316 may be available only after online authentication, or may be made available after offline authentication if allowed by policy. First use of vaults 316 may require online authentication, and offline access may be limited to at most the policy refresh period before online authentication is again required.

Network access to internal resources may occur directly from individual managed applications 310 through Access Gateway 306. The application management framework 314 is responsible for orchestrating the network access on behalf of each application 310. Client agent 304 may facilitate these network connections by providing suitable time limited secondary credentials obtained following online authentication. Multiple modes of network connection may be used, such as reverse web proxy connections and end-to-end VPN-style tunnels 318.

The Mail and Browser managed applications 310 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 306 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 306 may identify managed native applications 310 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 316 (containers) on the mobile device 302. The vaults 316 may be encrypted so that all on-device data including files, databases, and configurations are protected. For on-line vaults, the keys may be stored on the server (gateway server 306), and for off-line vaults, a local copy of the keys may be protected by a user password or biometric validation. When data is stored locally on the device 302 in the secure container 316, it is preferred that a minimum of AES 256 encryption algorithm be utilized.

Other secure container features may also be implemented. For example, a logging feature may be included, wherein all security events happening inside an application 310 are logged and reported to the backend. Data wiping may be supported, such as if the application 310 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 314 may be prevented in other ways. For example, when an application 310 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 320 without the use of an AD (active directory) 322 password for access to one or more applications. In some cases, some users do not know (or are not permitted to know) their AD password, so these users may authenticate using an OTP 320 such as by using a hardware OTP system like SecurID (OTPs may be provided by different vendors also, such as Entrust or Gemalto). In some cases, after a user authenticates with a user ID, a text is sent to the user with an OTP 320. In some cases, this may be implemented only for online use, with a prompt being a single field.

An offline password may be implemented for offline authentication for those applications 310 for which offline use is permitted via enterprise policy. For example, an enterprise may want StoreFront to be accessed in this manner. In this case, the client agent 304 may require the user to set a custom offline password and the AD password is not used. Gateway server 306 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 310 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 304 may be retrieved by gateway server 306 and used in a keychain. Each managed application may have one associated client certificate, identified by a label that is defined in gateway server 606.

Gateway server 306 may interact with an Enterprise special purpose web service to support the issuance of client certificates to allow relevant managed applications to authenticate to internal PKI protected resources.

The client agent 304 and the application management framework 314 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 302 is authenticated to the enterprise, and vice versa. Virtual smart cards for authentication to gateway server 306 may also be implemented.

Both limited and full Kerberos support may be additional features. The full support feature relates to an ability to do full Kerberos login to Active Directory (AD) 322, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 310 is not running.

A multi-site architecture or configuration of enterprise application store and an application controller may be supported that allows users to be service from one of several different locations in case of failure.

In some cases, managed applications 310 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Clock Rollback Security

Many mobile resource management (MRM) solutions (also including and referred to herein as EMM, MDM and MAM) may face the challenge of managing applications and their associated policies via a common control point managed by corporate information technology (IT) administrators. The actual policies that are available for any particular managed mobile application can vary greatly. Factors such as the particular MRM solution software version, the specific version of MRM tools or SDK used to prepare the application, and the application logic itself can all influence which policies and settings are available for IT administrators to configure and control.

Applications themselves can be developed and deployed quickly and updated frequently. As such, it is recognized that efficiencies can be gained by decoupling the policies from the underlying control point in such a way that the policy settings themselves as well as the administrative user interface (U/I) for configuring them need not be hardwired into the control point server software. Without this decoupling, the control point software would need to be upgraded every time a new application policy setting was needed.

A wide range of policies, including application-specific policies and settings, can be composed, configured through an administrative interface, and delivered to the deployed applications, without requiring changes to control point software.

Enterprises may create (or adapt) their native mobile applications using tools and SDKs associated with the MRM solution they have chosen to deploy. Depending upon the tools or SDK version used to prepare such applications, one can expect that there will be a default set of policies that the MRM system provides automatically. These default policies can be further augmented by an application developer defining their own application specific policies and settings.

All policies and settings may be defined using a declarative syntax (metadata) that in some variations may include the various elements associated with each setting. In an example, the metadata is provided in the form of an XML (Extensible Markup Language) document that defines individual elements listed for each setting. For example, to define the beginning and end of a policy file, an XML document may use the tags <policymetadata> and </policymetadata>, respectively. The collection of policy setting may be between section tags <policies> and </policies>. Each policy setting may include elements such as (but not limited to) the following:

a. Setting identifier, e.g., using special policy setting tags <policy> and </policy>, where the tags mentioned in the following elements are included between;
 b. Setting group or category identifier, e.g., included between <policycategory> and </policycategory> tags;
 c. Setting name, e.g., included between <policyname> and </policyname> tags;
 d. Setting type (Boolean, integer, string, multistring, enum, uniform resource identifier (URI), etc), e.g., included between <policytype> and </policytype> tags;
 e. Range of possible settings values (if needed dependent on setting type);
 f. Default setting value, e.g., included between <policydefault> and </policydefault> tags;
 g. Setting friendly name string (default language plus resource ID for localized name), e.g., included between <policystrings> and </policystrings> tags;
 h. Setting units and other user interface (U/I) display strings (default language plus references to resource ID for localized strings), e.g., included between <policystrings> and </policystrings> tags;
 i. Explanation and extended help text strings (default language plus references to resource ID for localized strings), e.g., included between <policystrings> and </policystrings> tags;

The various setting group or category identifiers that are available for each policy setting may be defined using special <category> and </category> tags, and the collection of setting group or category identifiers may be included between <categories> and </categories> tags. The collection of setting group identifiers and the collection of settings may be included between the <policymetadata> and </policymetadata> tags. Accordingly, an XML document that defines a policy may take the general form similar to the following nested arrangement of XML tags with comments in [ ]:

```
<policymetadata>
    [tag to define version number of policy]
<versionnumber>1.1</versionnumber>
<categories>
    <category>
        [example definition for a setting group identifier provided below]
        <categoryid>Access_Auth</categoryid>
        <catlabel res_id="ACCESS_AUTH ">Authentication</catlabel>
    </category>
    [additional definitions for setting group identifiers]
</categories>
<policies>
    <policy>
        [example definition for a setting provided below]
        <policyname>ReauthenticationPeriod</policyname>
        <policytype>integer</policytype>
        <policycategory>Access_Auth</policycategory>
        <policydefault>480</policydefault>
        <policystrings>
            <title      res_id="REATUH_PERIOD_TITLE">Reauthentication
    period (minutes)</title>
            <units res_id="REATUH_PERIOD_UNITS">minutes</units>
            <description  res_id="REATUH_PERIOD_DESC">Defines  the
    period before a user is challenged to authenticate again. If set to zero, the user
    is prompted for authentication each time app is started or activated. Default
    value is 480 minutes (8 hours).</description>
        </policystrings>
    </policy>
    [additional definitions for settings]
</policies>
</policymetadata>
```

When a user initiates a managed application while "online" (i.e., connected to a network through which the user can communicate with one or more enterprise servers), the system may query a central or network time server to confirm a current date/time (as used herein, "time" may also include the corresponding date, as applicable). The system may then compare the confirmed date/time to any temporal conditions in any applicable policy files to determine whether each permission/restriction in the policy file should be enforced. Using a network time server provides a threshold level of security because the server is associated with a trusted time source (e.g., controlled by the enterprise or a trusted third party).

In order to permit "offline" use of managed applications (use when a network connection is not available, e.g., on many airplane flights), one or more of the managed applications may be permitted to rely on a local system clock when offline in order to determine whether a temporal restriction defined in a policy is met. If the temporal restriction is met, based on the date and time of the local system clock, then an action may be allowed or otherwise permitted by the policy while in offline mode. If the temporal restriction is not met, based on the date and time of the local system clock, then the action might be denied or otherwise prevented from occurring by the local device while in offline mode.

In some circumstances, if the local system clock has been altered (e.g., by a malicious user) to be within the timeframe allowed by the temporal restriction, then the user might be permitted to perform an action that should be otherwise denied. That is, if a user manually changes the system clock, or "rolls back" the clock to a specific date/time, the user in effect circumvents the policy and may be permitted to perform some action that should really have been denied or prevented by the MRM policy and enforcement system. These types of temporal circumventions are referred to herein as rollback attacks. In addition, some systems rely on the local system clock regardless of whether a device is in online or offline mode, thereby increasing the susceptibility to such rollback attacks.

In order to prevent rollback attacks while still allowing offline use of managed applications, each managed application may be configured to store the local system time when the managed application closes, enters a background state, or upon the occurrence of any other event or lapsed period of time. When the application becomes active again (or regain focus, etc.), the current system time is compared with the stored time. If the current system time is earlier than the stored time, the application determines that the local system time was altered, and may take remedial action to prevent a rollback attack, as further described below.

An application may allow some time leeway for slight clock adjustments, daylight savings time, and/or time zone changes, in order to avoid false positive determinations (however, use of universal coordinated time (UCT) may negate the need for such leeway in some circumstances). That is, a system clock on a device may be constantly adjusted in small increments based on network time. Also, daylight savings time adjustments may happen either as an automatic adjustment (time of year, time zone change, etc.), or a user can opt to set the clock manually. Some margin may be used to avoid false positive determinations based on reasonable time changes. In one embodiment, any combination of time changes totaling more than seventy (70) minutes in a twenty-four (24) hour period may trigger a clock rollback alert as described herein. Thus, any combination of the atomic clock on the device (always increasing tick count) and observations of the local system time-of-day resulting in a cumulative drift backwards of more than 70 minutes may trigger an alert and resultant actions as described herein. Other heuristics may alternatively be used, and this is just one illustrative example.

When the managed application determines that the local system clock has been altered, the device (or MRM service, or application) can take one or more corrective actions, e.g., system lock, system wipe, selective app locking, selective wipe, local user reauthentication, device reauthentication with MDM/MAM server, require new policies from MDM/MAM server, trigger all local time based policies, IT notification, or require use of a network time server, to name a few. Other actions may be performed instead or in addition to one or more these identified actions.

Figure 4:
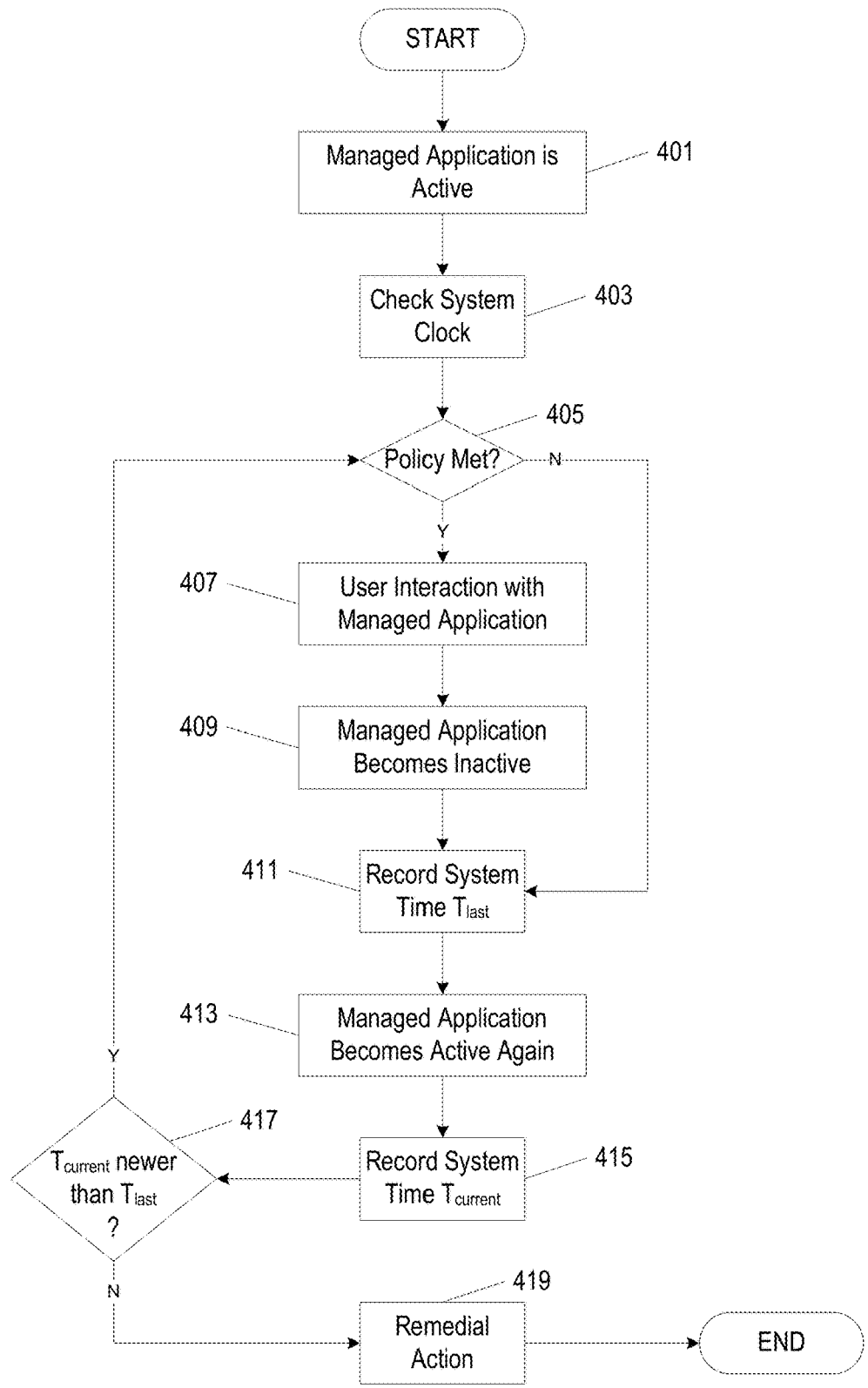
FIG. 4 depicts a flow chart of an illustrative method for preventing clock rollback attacks according to aspects described herein.

FIG. 4 illustrates a method for preventing rollback attacks according to one or more illustrative aspects described herein. In step 401 a managed application is initially activated on a device 302 (the device may also include device 107, 109, and/or 202, but for brevity references are made herein to device 302). Initial activation typically includes the first launch of a managed application on a device, but may alternatively include other types of activation as well. For example, in a virtualized environment, activation may include the first time a managed application is accessed remotely, e.g., through virtualization software such as Citrix RECEIVER. In step 403 device 302 checks the system clock in use. The system clock may include the local system clock or a network/enterprise clock. In step 405 device 302, through client agent 304, confirms that applicable policy file(s) permit use of the managed application during the time identified by the system clock in step 403. If use of the managed application is not permitted, then the method skips to step 411, further discussed below. In step 407 the user then interacts with the managed application per his or her usual custom.

At some point later, in step 409, the managed application becomes inactive. Inactivity may occur in numerous ways, e.g., as a result of a user closing the application, minimizing the application, the application entering a background state, and losing focus to another window or application, among others. These are merely examples of events that may trigger inactivity in step 409. Other events may also or alternatively be included. In some aspects, inactivity may be associated with a timeout period, at the end of which the method automatically proceeds to step 411 to confirm that no rollback attack has occurred.

In step 411 device 302 records the system time, $T_{last}$, corresponding to the point at which the application became inactive in step 409. At some time later, in step 413, the managed application becomes active again, e.g., the user relaunches the application, the application regains focus, is restored from the background, etc. In aspects that use a timeout, becoming active again may occur automatically and immediately after recording the system time in step 411.

After the managed application becomes active again, then in step 415 device 302 records the current system time, $T_{current}$, associated with the application becoming active again. In step 417 device 302 compares $T_{current}$ with $T_{last}$. If $T_{current}$ is newer than $T_{last}$ as one would expect, then the returns to step 405 to confirm all applicably policy conditions are still met. However, if $T_{current}$ is older than $T_{last}$, then the system may infer that a malicious entity has manually altered, or "rolled back", the system clock.

When the device 302 determines that the system clock has been altered or rolled back in step 417, the device (or MRM service, or application) can take one or more remedial or corrective actions in step 419, e.g., system lock, system wipe, selective wipe, app locking, local user reauthentication, device reauthentication with MDM/MAM server, policy file update, expire all policies based on system time, notify an enterprise administrator, and/or require use of a network time server, to name a few. Other actions may be performed in step 419 instead or in addition to one or more these identified actions.

A system lock generally refers to a situation where a device locks up or "freezes" until the user reauthenticates. The system lock may be all or partial. That is, all services might be locked, or only enterprise-based services might be locked, until the user is able to reauthenticate, establish a connection with an enterprise time server, or perform some other action that reestablishes trust (e.g., restores the device's confidence that the user is not malicious).

A system wipe generally refers to an automatic deletion of some data from the device. The system wipe may be full or selective. A full system wipe might restore the device to a "factory fresh" state, including only the data and software included with the device at a time of manufacture. A selective wipe might delete only enterprise-related data, e.g., applications, files and data that belong to the enterprise or that were created for use with one or more enterprise applications on the device.

App locking generally refers to disabling a user's ability to launch a particular piece of software, e.g., an enterprise-specific application, until the user reauthenticates or otherwise reestablishes trust.

Local user reauthentication generally refers to requiring a local user of the device to reauthenticate, which may include one or more of: 1) downloading one or more current policy files; 2) re-entering a username/password combination, or providing other credentials, e.g., either locally and/or to an enterprise authentication server; and 3) re-establishing a connection with a trusted time server to reset the local system clock based on the trusted time server.

Device reauthentication with an MDM/MAM server generally refers to the device establishing a connection with an MRM server to confirm the device is authorized to access one or more enterprise resources.

A policy file update generally refers to a query to a policy server to ensure that the device has current policy file(s) installed. New policy files might be required to be downloaded, regardless of current policy file status, in some aspects. That is, all policy files on the device might be nullified when a rollback attack is detected.

In addition to or instead of any of the above actions, the device or application in step 419 might send an electronic message to a system administrator informing them of the time discrepancy detected in step 417. The system administrator may then take further action as needed/warranted based on his or her security considerations.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    recording, by a computing device, a first system time when an application becomes inactive;
    recording, by the computing device, a second system time when the application subsequently becomes active;
    determining whether the second system time is not more recent than the first system time; and
    initiating a remedial action to restrict access to the application on the computing device when the second system time is not more recent than the first system time, and the first system time and the second system time differ by more than a predefined amount of time,
    wherein the method will perform the recording steps, the determining step, and the initiating step for a first application on the computing device based on one or more rules defined in one or more policy files stored on the computing device while permitting a second application to execute at least without performing the initiating step even when the second system time is not more recent than the first system time, when the first system time and the second system time differ by more than the predefined amount of time, and when there is a temporal restriction on the second application that would otherwise restrict execution of the second application.

2. The method of claim 1, wherein the predefined amount of time is zero (0).

3. The method of claim 1, wherein the predefined amount of time is seventy (70) minutes within a twenty-four (24) hour period.

4. The method of claim 1, wherein the predefined amount is based on a time-zone change.

5. The method of claim 1, wherein the application becomes inactive as a result of one of the application closing, the application enters a background state, or a predetermined period of time lapses without any application activity.

6. The method of claim 1, wherein the remedial action comprises one or more of a system lock, a system wipe, selectively locking one or more managed applications on the computing device, selectively wiping managed data off the computing device, requiring reauthentication of a user of the computing device, requiring reauthentication of the computing device with an enterprise device management system, obtaining one or more new policy files from an enterprise device management system, or requiring use of a network time server.

7. One or more non-transitory computer readable media storing computer readable instructions that, when executed by a computing device, cause the computing device to perform:
   recording, by the computing device, a first system time when an application becomes inactive;
   recording, by the computing device, a second system time when the application subsequently becomes active;
   determining whether the second system time is not more recent than the first system time; and
   performing a remedial action to restrict access to the application on the computing device when the second system time is not more recent than the first system time, and the first system time and the second system time differ by more than a predefined amount of time,
   wherein the computer readable instructions, when executed, further cause the computing device to perform the recording steps, the determining step, and the initiating step for a first application on the computing device based on one or more rules defined in one or more policy files stored on the computing device while permitting a second application to execute at least without performing the initiating step even when the second system time is not more recent than the first system time, when the first system time and the second system time differ by more than the predefined amount of time, and when there is a temporal restriction on the second application that would otherwise restrict execution of the second application.

8. The computer readable media of claim 7, wherein the predefined amount of time is zero (0).

9. The computer readable media of claim 7, wherein the predefined amount of time is seventy (70) minutes within a twenty-four (24) hour period.

10. The computer readable media of claim 7, wherein the predefined amount is based on a time-zone.

11. The computer readable media of claim 7, wherein the application becomes inactive as a result of one of the application closing, the application enters a background state, or a predetermined period of time lapses without any application activity.

12. The computer readable media of claim 7, wherein the remedial action comprises one or more of a system lock, a system wipe, selectively locking one or more managed applications on the computing device, selectively wiping managed data off the computing device, requiring reauthentication of a user of the computing device, requiring reauthentication of the computing device with an enterprise device management system, obtaining one or more new policy files from an enterprise device management system, or requiring use of a network time server.

13. A computing device comprising:
   a processor; and
   memory storing computer readable instructions that, when executed by the processor, cause the computing device to perform:
      recording, by the computing device, a first system time when an application becomes inactive;
      recording, by the computing device, a second system time when the application subsequently becomes active;
      determining whether the second system time is not more recent than the first system time; and
      performing a remedial action to restrict access to the application on the computing device when the second system time is not more recent than the first system time, and the first system time and the second system time differ by more than a predefined amount of time,
   wherein the computer readable instructions, when executed, further cause the computing device to perform the recording steps, the determining step, and the initiating step for a first application on the computing device based on one or more rules defined in one or more policy files stored on the computing device while permitting a second application to execute at least without performing the initiating step even when the second system time is not more recent than the first system time, when the first system time and the second system time differ by more than the predefined amount of time, and when there is a temporal restriction on the second application that would otherwise restriction execution of the second application.

14. The computing device of claim 13, wherein the predefined amount of time is zero (0).

15. The computing device of claim 13, wherein the predefined amount of time is seventy (70) minutes within a twenty-four (24) hour period.

16. The computing device of claim 13, wherein the predefined amount is based on a time-zone change.

17. The computing device of claim 13, wherein the application becomes inactive as a result of one of the application closing, the application enters a background state, or a predetermined period of time lapses without any application activity.

18. The computing device of claim 13, wherein the remedial action comprises one or more of a system lock, a system wipe, selectively locking one or more managed applications on the computing device, selectively wiping managed data off the computing device, requiring reauthentication of a user of the computing device, requiring reauthentication of the computing device with an enterprise device management system, obtaining one or more new policy files from an enterprise device management system, or requiring use of a network time server.

19. The method of claim 1, wherein a running application becomes inactive as a result of losing focus to another active application on the computing device.

20. The computer readable media of claim 7, wherein a running application becomes inactive as a result of losing focus to another active application on the computing device.

21. The computing device of claim 13, wherein a running application becomes inactive as a result of losing focus to another active application on the computing device.

\* \* \* \* \*